United States Patent [19]
Pires

[11] Patent Number: 5,345,505
[45] Date of Patent: * Sep. 6, 1994

[54] CODING SYSTEM FOR A DATA SIGNAL

[76] Inventor: H. George Pires, 47H Valley Rd., Hampton, N.J. 08827

[ * ] Notice: The portion of the term of this patent subsequent to Apr. 20, 2010 has been disclaimed.

[21] Appl. No.: 27,130

[22] Filed: Mar. 5, 1993

Related U.S. Application Data

[63] Continuation-in-part of Ser. No. 664,107, Mar. 4, 1991, Pat. No. 5,204,900.

[51] Int. Cl.$^5$ .............................................. H04N 7/167
[52] U.S. Cl. ........................................ 380/20; 380/10
[58] Field of Search ................................... 380/20, 10

[56] References Cited

U.S. PATENT DOCUMENTS

| | | | |
|---|---|---|---|
| 4,833,170 | 5/1989 | Hirashima | 380/20 |
| 4,907,269 | 3/1990 | Guillon et al. | 380/20 |
| 4,953,208 | 8/1990 | Ideno | 380/20 |
| 5,204,900 | 4/1993 | Pires | 380/20 |

*Primary Examiner*—David C. Cain
*Attorney, Agent, or Firm*—Rohm & Monsanto

[57] ABSTRACT

A system for scrambling and descrambling complex data signals, such as video signals, employs a system for encoding the decoding information, in the form of two security keys, directly onto the scrambled signal being transmitted, without the need of a second communications link for delivering one of the keys. The data signal is encoded with identification information which identifies a specific one of multiple decoders at the receiving stations, and a scrambled security code. The security code can only be descrambled by the decoder which is specifically identified in the identification code. A security code descrambling algorithm which is specific to the respectively associated decoder is permanently installed in the decoder along with the identification information. The relationship between the security code descrambling algorithm and the identification code for each of the decoders is stored in a memory at the transmitting station. A field code is transmitted in the scrambled complex signal which, when used in conjunction with the unscrambled security code, provides the decoder with the information needed to identify the scrambling distortion which had been introduced into the complex signal.

25 Claims, 3 Drawing Sheets

CODING SYSTEM FOR A DATA SIGNAL

RELATIONSHIP TO OTHER APPLICATION

This application for United States Letters Patent is a continuation-in-part patent application of co-pending application Ser. No. 07/664,107 which was filed in the United States Patent and Trademark Office on Mar. 4, 1991 now U.S. Pat. No. 5,204,900. The entirety of that application is incorporated herein by reference.

BACKGROUND OF THE INVENTION

This invention relates generally to signal encryption and decoder systems, and more particularly, to a system for scrambling and descrambling data signals wherein the decoding information is carried directly with the channel of interest, the system being very difficult to defeat by individual and large scale pirates.

There is a need for a data encryption system which transmits a scrambling code from a sending unit to a number of decoders at respective receiving stations, wherein the system is inexpensive and affords a high degree of security. In the field of data transmission, in particular, there is a need for a coding system which achieves the aforementioned advantages, and which is compatible with a wide variety of scrambling systems. Such adaptability of the coding scheme would address directly the issue of maintaining costs low.

It is, of course, the primary purpose of a data scrambling scheme to prevent the information content of the data signal from becoming available to unauthorized receivers. Although it is important to achieve a high measure of security against unauthorized reception by individuals, such as individual cable television service subscribers, the far greater problem is that of pirates who operate on a large scale. In this regard, it is important to recognize that absolute system security, although a worthwhile goal, is not the end to be achieved. Any coding system, no matter how secure, can eventually be defeated. However, the business of pirating transmitted data or video is, like any other business, subject to certain economic principles. More specifically, the large scale pirate must always be mindful of the costs associated with overcoming a data encryption system. There is, therefore, a need for a data scrambling and descrambling system which is prohibitively expensive for the pirate to overcome on a large scale.

In addition to the foregoing, it is desirable that the cost of data scrambling and descrambling systems be reduced, such as by permitting decoders to be available to, and owned by, customers or subscribers. Such decoders should be of a type which can be enabled only by the station operator, who also should have the ability to disable any decoder at anytime.

One of the problems with present scrambling systems is that the decoding function is not active, in that the keys required to effect decoding do not change rapidly. In some such systems, a simple short circuit or jumper connection will permanently enable the decoder. There is a need for a decoder arrangement which is immune from any one-time modification which would enable same permanently. In addition, there is a need for a decoder system which avoids the possibility that a bank of switches on a pirate decoder could be set for a particular configuration which would last for a viewing period.

It is another shortcoming of currently available data security systems that a second system, such as a telephone link or a card is required to effect descrambling. In such systems, two keys are sent over different links of communication, one over the air and the other via a telephone link.

Present day television systems, such as cable franchise systems, are not amenable to impulse purchasing. In most known systems, a second communication link is required to request the desired service, such as a "pay-per-view" program, well in advance of the commencement of the scheduled program. There is, therefore, a need for a system which will permit a subscriber to accept billing for pay-per-view programming at the push of a button at the remote location.

It is, therefore, an object of this invention to provide a system which encrypts and decodes a multicomponent signal of interest, such as a data signal, with a high degree of security.

It is another object of this invention to provide a data encoding and decoding system wherein pirating of services on a large scale is prohibitively expensive.

It is also an object of this invention to provide a signal encoding system wherein the information required to achieve decoding is carried, at least in part, in the encoded signal of interest.

It is a further object of this invention to provide a data signal scrambling system wherein the system operator can remotely disable or enable ones of remote decoders, as desired.

It is additionally an object of this invention to provide a data scrambling system of the type where an operator supplies a multiplicity of remote decoders, wherein at least selectable ones of the remote decoders are automatically disabled over a predetermined period of time, unless the operator actively maintains decoder enablement.

It is yet a further object of this invention to provide a scrambled data transmission system wherein the decoding process is active, requiring rapidly periodic decoding processes to be performed on the data signal.

It is also another object of this invention to provide a data scrambling system where no additional communications links are required to transmit decoding information or keys.

It is yet an additional object of this invention to provide a data transmission system wherein highly selective enable merit, such as pay-per-view or impulse purchasing can be accommodated without requiring a communication link between the viewer and the system operator.

It is still another object of this invention to provide a scrambled data transmission system wherein security codes are changeable throughout the system without requiring interruption of the service.

It is a yet further object of this invention to provide a secure data transmission system wherein the system can be operated in a plurality of security modes simultaneously.

It is also a further object of this invention to provide a secure data transmission system having a plurality of security modes wherein the security mode is changeable throughout the system while the system remains operative to all authorized subscribers during transition from one security mode to another.

It is additionally another object of this invention to provide a signal transmission system wherein a subscriber can determine to accept a pay-per-view program directly at a remote decoder station, without the need for a second communication link.

A still further object of this invention is to provide a data coding system which can be employed with a wide variety of scrambling arrangements.

An additional object of this invention is to provide a descrambling system which cannot be overcome merely by placing an enabling jumper wire in the circuit.

Yet another object of this invention is to provide a descrambling system which employs decoders at each receiving station, wherein the decoders cannot be enabled without authorization even for the duration of a viewing period.

Another object of this invention is to provide a signal scrambling and descrambling system which employs multiple decoder keys but does not rely on channels of communication other than the signal channel itself to transmit descrambling information to the decoder at the receiving station.

A yet further object of this invention is to provide a coding system for scrambling a data transmission signal which is compatible with a plurality of data scrambling systems.

SUMMARY OF THE INVENTION

The foregoing and other objects are achieved by this invention which provides, in a data transmission system aspect of the invention, a system for supplying data contained in a data signal from a sending station exclusively to a preselected one of a plurality of receiving stations. In accordance with the invention, a scrambling system is coupled at an input thereof to the sending station for receiving the data signal and for distorting the data signal in accordance with a selected one of a plurality of distortion modes. In this manner, a distorted, or unintelligible, data signal is produced. An identification encoder is coupled to the scrambling system for encoding the distorted data signal with identification information which identifies the one of the receiving stations which has been selected to receive the data. A security code encoder is coupled to the scrambling system for encoding the distorted data signal with security code information. A field code encoder is coupled to the scrambling system for encoding the distorted data signal with field code information. In one practical embodiment of the invention, there is a fixed relationship on the distorted data signal between the security code information and the field identification information.

The system is further provided with a plurality of decoders, each coupled to a respectively associated one of the receiving stations. Each such decoder is provided with a respective identification code and a conversion code. In addition, each decoder has a security code acceptance arrangement which is responsive to the identification information and facilitates acceptance of the security code information.

In a specific illustrative embodiment of the invention, a security code scrambling arrangement is coupled to the security code encoder for scrambling the security code which identifies the selected distortion mode. For example, a mathematical processor combines mathematically the scramble security code information with the conversion code which is associated with the preselected one of the receiving stations. The combination produces mode code information which corresponds to the selected one of the plurality of distortion modes applied to the data signal to distort same.

In one highly advantageous embodiment of the invention, each of the decoders is provided with a security code descrambling system which is specific to the particular decoder. Thus, only the one of the plurality of decoders associated with the preselected receiving station is enabled to descramble the security code.

In a further embodiment, a field identification encoder encodes field identification information onto the data signal for identifying at least one component of the distorted data signal which can be restored in response to the descrambled security code. More specifically, a mode code is generated which identifies a distortion mode in response to the accepted security code information and the field identification information.

Further with respect to the system aspect of the invention, the sending station is provided with a data storage means, such as a memory, for storing information corresponding to a relationship between the identification information and the conversion code for each of the decoders. In the practice of the invention, the identification information and the conversion code are each permanently installed in their respectively associated decoders during manufacture. The information which is encoded onto the distorted data signal, as previously described, will generally be delivered to the decoders during a vertical blanking portion of the distorted data signal.

In accordance with a further aspect of the invention, a decoder system is provided for descrambling a scrambled data signal. The decoder is provided with a first key code receiver for receiving a first key code which is encoded in the scrambled data signal. A second key code receiver receives a second key code which also is encoded in the scrambled data signal. The second key code, however, is encoded in a scrambled format and in a predetermined relationship with respect to the first key code. Thus, upon identification of the first key code in this two key descrambling system, the location of the second key code on the scrambled data signal will be known to the decoder. A first key code identification system installed in the decoder is provided for identifying the first key code. Additionally, a third key code descrambling system descrambles the third key code in response to the second key code, so as to produce a descrambled code which is employed to descramble the data signal.

In accordance with a specific illustrative embodiment of this decoder aspect of the invention, the second key code descrambling system is provided with a conversion code storage memory which stores the second key code for unscrambling the third key code. In addition, there is provided a processor for producing the descramble code in response to the conversion data and the second key code. These operations permit the third key code to be changed rapidly or periodically in the scrambled data signal, so as to afford a greater measure of security.

In one highly advantageous embodiment of the invention, the decoder system is provided with a billing arrangement for storing billing data encoded in the scrambled data signal. The billing data corresponds, in some embodiments, to a credit value which is entered into a billing memory. The billing data also is used for enabling and disabling the decoder, and thereby determining whether the scrambled data signal will be descrambled. Thus, the billing system aspect of the invention is provided with a billing data storage memory for storing the billing data, and a remote acceptance arrangement which enables decrementation of the credit amount in the billing data. Of course, in other embodiments of the invention, the system may be configured to operate inversely, wherein a diminution of the billing credit corresponds to incrementation of the credit amount in the billing data. In any event, when the value in the billing data storage memory reaches a predetermined amount, the descrambler which descrambles the scrambled data signal will selectively be enabled, or disabled, as the case may be.

In the practice of the billing embodiment of the invention described immediately hereinabove, it may be desirable to distinguish between the billing data and the second key code, both of which are transmitted on the scrambled data signal. This is achieved, in one embodiment, by providing a selector which is used to determine whether the incoming data is billing data or a security code. In one embodiment, the distinction between billing data and the second key code is effected by modifying an additional bit in the identification code. Thus, for example, a high bit would indicate the data to be billing information, whereas a low bit would indicate that a second key code is incoming.

In a still further aspect of the invention, a system for sending an encrypted information signal from a sending station, wherein the information signal is encrypted in a selected one of a plurality of encryption modes, sends the encrypted signal to a plurality of receiving stations. Each of the receiving stations is provided with a decoder arrangement, but only predetermined ones of the receiving stations are authorized to decode the encrypted signal so as to receive the information content therein. This arrangement is provided with a security code sending system which is coupled to the sending station for sending with the encrypted signal a first security code which is to be stored in each of the decoders. However, a security code change arrangement is provided to change the first security code in each of the decoders to a second security code over a transitional period of time. During such transition, some of the decoders have stored therein the first security code, while others have the second security code. During this transitional period, a field code generator, which, as previously noted, sends field information to the receivers, is adapted to send field code information which is compatible with the first and second security codes simultaneously. Thus, the station operator can change the security codes, without interrupting service to any of the receivers.

In accordance with a method aspect of the invention, the present invention provides a method of supplying data contained in a data signal from a sending station exclusively to a preselected one of a plurality of receiving stations, wherein each of the receiving stations has a decoder associated therewith, as described above. This method aspect contains the following steps:

distorting the data signal at the sending station in accordance with a predetermined one of a plurality of alternative distortion modes;

encoding an identification code onto the data signal which uniquely identifies one of the decoders;

encoding a first security key onto the data signal at the sending station, the first security key being encoded in a predetermined scrambled format and in a predetermined relationship with respect to the encoded identification code;

sending the encoded data signal to the plurality of receiving stations, whereby a selected receiving station having a decoder associated therewith which has stored therein an identification code which corresponds to the identification code encoded onto the data signal will accept the first security key; and sending a second security key to the plurality of receiving stations whereby the second security key is combined with the first security key to form a mode code which identifies the distortion introduced into the original data signal.

In a specific illustrative embodiment of this method aspect of the invention, the invention is provided with the further step of descrambling the first security key in response to conversion algorithm which is specific to the selected receiving station. In other embodiments, a second security key is encoded onto the data signal, and a mode code is formed at the receiving station in response to the descrambled first security key and the second security key. This mode code, as previously indicated, corresponds to the predetermined one of the plurality of alternative distortion modes. Thus, with this code, the distortion which has been applied to the data signal can be removed, and the information made available at the receiving station. More specifically, the descrambler is enabled in response to the billing data.

It is, therefore, a feature of this invention that the decoding process is active, in that the mode of encryption changes several times per second in certain embodiments. This requires the decoders to perform continuous operations on the data signal, and therefore there is no point in the circuitry where a simple permanent modification will lead to permanent decoder enablement.

It is another feature of this invention that two security keys are employed to effect descrambling, but both keys are sent on the data channel itself, which is not available to pirates.

It is also a feature of this invention that pay-per-view and impulse purchases are easily accommodate without requiring a return communications link from the decoders to the station operator.

It is a further feature of this invention that the security codes can be changed without interruption of service. These codes are transmitted individually to the decoders and are changed on a regular basis, such as daily, weekly, monthly, etc.

BRIEF DESCRIPTION OF THE DRAWING

Comprehension of the invention is facilitated by reading the following detailed description, in conjunction with the annexed drawing, in which:

FIG. 4a, b, c and d are a graphic representation of data bit streams and identifies different portions of the data stream in a specific illustrative embodiment of the invention.

DETAILED DESCRIPTION

Figure 1:
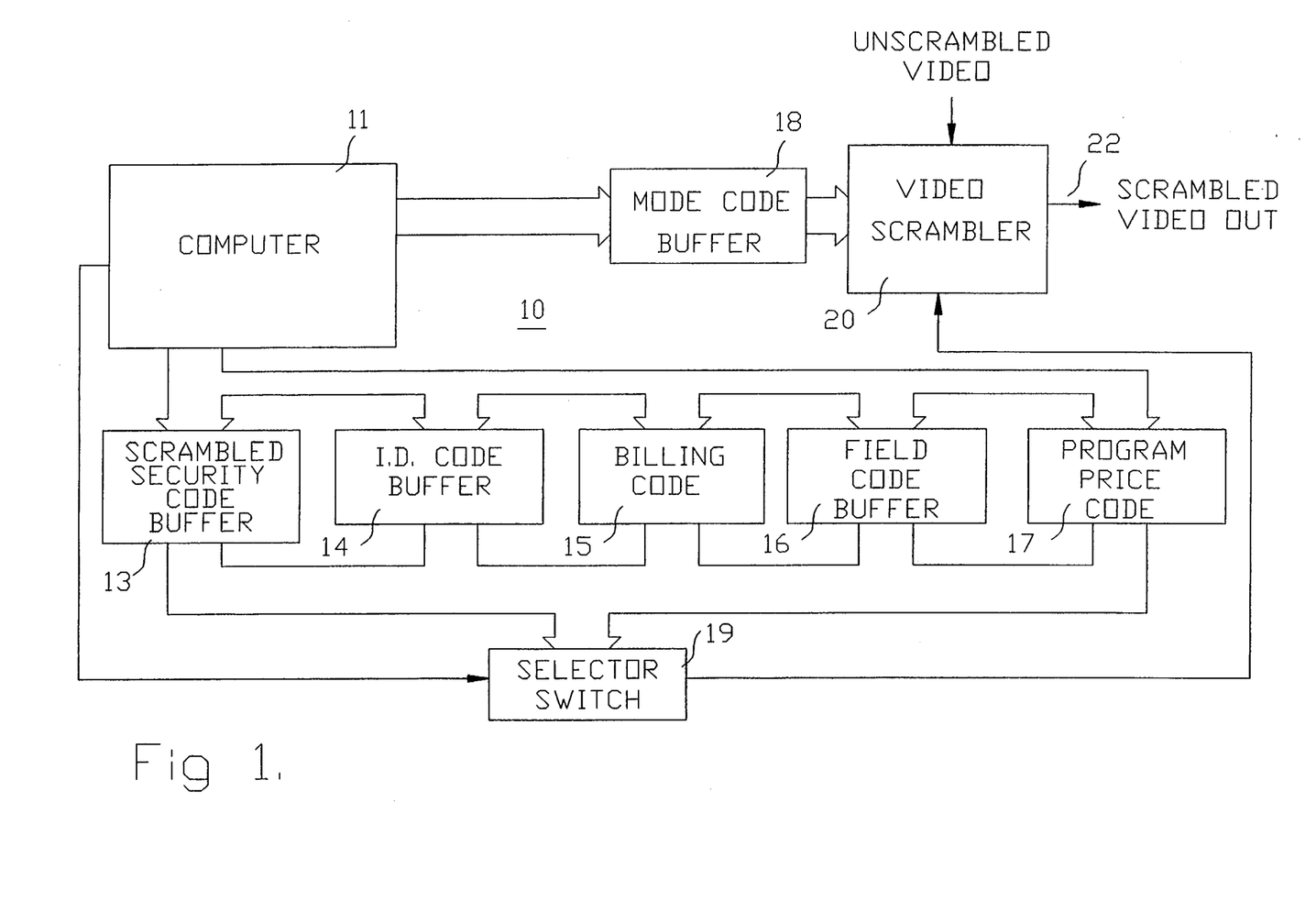
FIG. 1 is a block and line representation of a data scrambler system which is constructed in accordance with the principles of the invention.

FIG. 1 is a block and line representation of an encoder system 10 which, in this specific illustrative embodiment, converts unscrambled video to scrambled video, and encodes certain billing and descrambling information directly onto the scrambled video. As shown, encoder system 10 is provided with a computer 11 which loads 6 buffers. The 6 buffers are scrambled security code buffer 13, ID code buffer 14, billing code buffer 15, field code buffer 16, program price code buffer 17, and mode code buffer 18. Computer 11 also drives a selector switch 19 which selects the data of five of the six buffers, and delivers the selected data to a video scrambler 20. Video scrambler 20 has an input 21 for receiving an unscrambled video signal, and an output at 22 for providing the scrambled video output signal.

In this embodiment, video scrambler 20 is capable of scrambling the video signal in 256 different ways, one way at a time. Some of the scrambling modes might be, for example, time shifting the video relative to the sync in one of 256 different relationships, or storing the complete field of video and transmitting the horizontal lines scrambled in 256 different combinations. The mode code value which is stored in mode code buffer 18 determines which particular combination is to be used for any given field. The mode code is sent scrambled to the decoders (not shown in this figure, as will be described hereinbelow). The scrambled mode code information is decoded by the decoders whereby the decoder is enabled to identify the mode code at the receiving station (not shown in this figure). Recognizing the mode code, the decoders are then able to perform the reversed process of descrambling, or undistorting, the video signal, thereby making the information content therein available at the receiving station.

In operation, computer 11 loads, in this embodiment 16 bits of data into each of the five buffers 13 to 17. An additional eight bits of data is delivered to mode code buffer 18. The mode code buffer is thereby able to deliver to video scrambler 20 one of 256 combinations.

Figure 2:
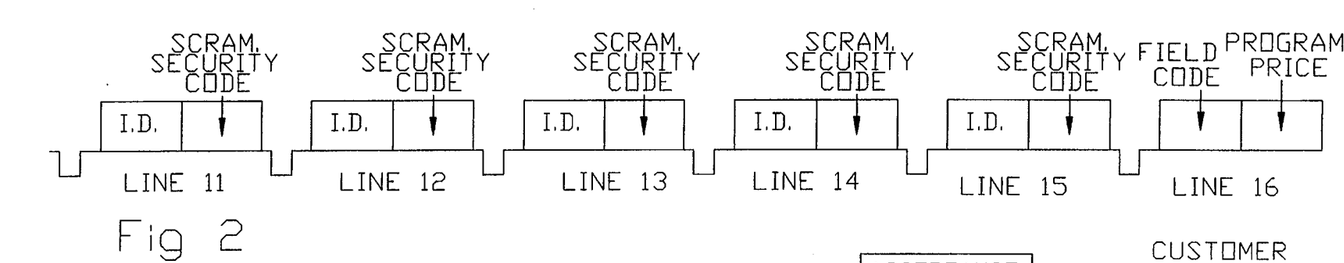
FIG. 2 is a simplified wave form representation of a data signal which illustrates the locations thereon of the encoded data.

FIG. 2 is a schematic representation of encoded video wave forms produced at output 22 of video scrambler 20, particularly lines 11 through 16 thereof, which occur during the vertical blinking portion.

As shown, each of lines 11 through 15 are used to address one decoder at a time using an ID code and an appropriately scrambled security code. The computer has stored therein a listing of all active ID codes and the corresponding conversion codes. The computer therefore loads the two corresponding codes into scrambled security code buffer 13 and ID code buffer code 14. When line 11, shown in FIG. 2 arrives at video scrambler 20, the selector switch is ordered to load the ID code and transfer same into the video scrambler for transmission. Half way down line 11, as shown in FIG. 2, the encoder is ready for the corresponding scrambled security code. At this point in time, selector switch 19 is ordered by computer 11 to download the data contained in scrambled security code buffer 13 and to transmit same to video scrambler 20. At this point, computer 11 loads a new ID code into ID code buffer 14, and a new corresponding security code into security code buffer 13. At the beginning of line 12, the selector is again ordered to download the data in the ID buffer followed half way down the line by downloading the scrambled security code buffer. In this manner, the system proceeds to the end of line 15. The computer then sends a field code to the field code buffer, and an appropriate mode code to the mode code buffer. It also sends the program price data to program price code buffer 17.

During line 15, the field code and the program price are sent to the video scrambler by selector switch 19 in the same manner as all other information was loaded. Once every billing period, the length of which is controlled by the station operator, the computer loads a billing code instead of a security code into the billing code buffer. When this is done, the computer instructs the selector switch to download the billing code instead of the scrambler security code, and the latter is thus transmitted to the video scrambler.

Figure 3:
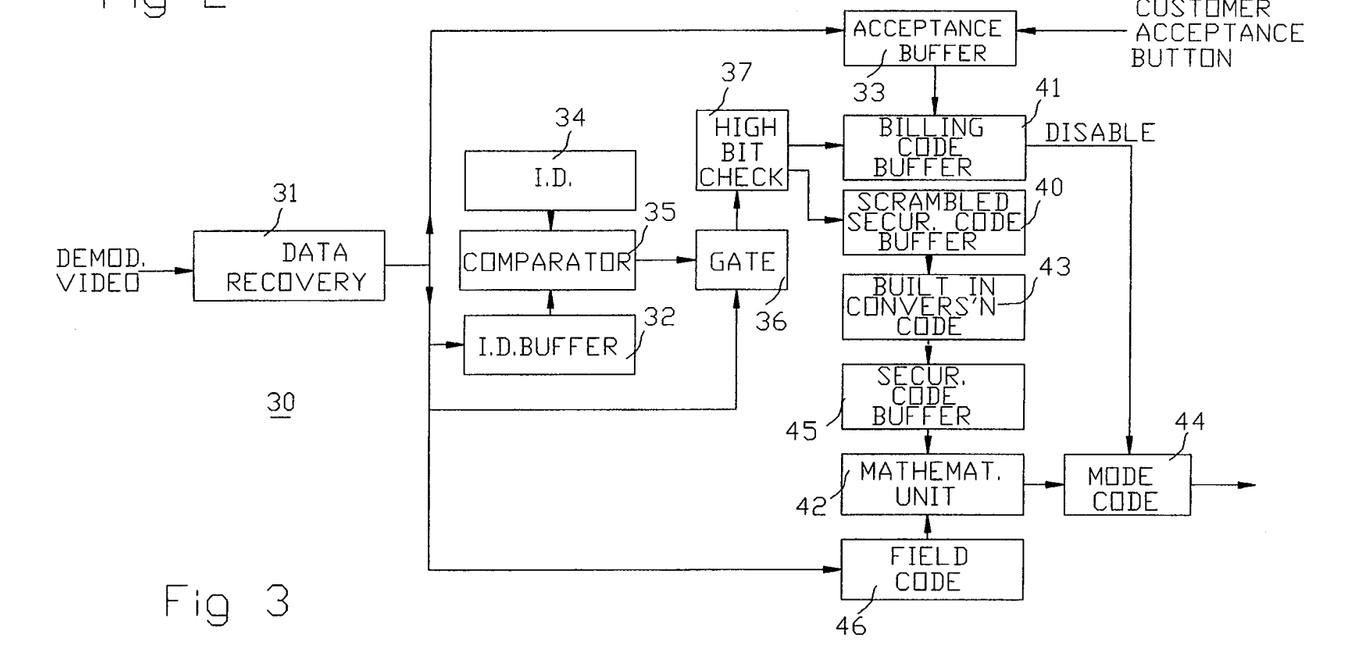
FIG. 3 is a block and line representation of a decoder system constructed in accordance with the principles of the invention.

FIG. 3 is a block and line representation of a decoder arrangement 30 which is useful for restoring the video signal. As shown, data is received and removed from lines 11 through 16 of the video signal shown in FIG. 2 using conventional processing techniques in a data recovery system 31, which shown in FIG. 3. The data obtained from the video signal is delivered into an ID buffer 32 and an acceptance buffer 33. Acceptance buffer 33 accepts only the second half of the data on line 16, while ID buffer 32 accepts the first half of each line. If the ID value corresponds to the internal ID number stored in ID memory 34, a comparator 35 operates a gate 36 whereby the second half of the data on the line enters a high byte check circuit 37. If the first byte of the data is high, it is conducted to a scrambled security code buffer 40. However, if the first byte is low, then it is conducted to a billing code buffer 41.

The data which is stored in buffer 40 is a scrambled security code. It is then subjected to a conversion code which is stored in a conversion code memory 43, to produce an unscrambled version of the security code, which is stored in security code buffer 45. A mathematic unit 42 performs a predetermined operation, such as addition, on the incoming security code using the field code information present in a field code buffer 46. This data is received from data recovery system 31, and corresponds to the information in the second half of line 16 of the video signal shown in FIG. 2. Using the unscrambled security code and the field code, the mathematic unit produces at its output a mode code which is stored in a mode code buffer 44. The value in the mode code buffer is conducted to a video decoding circuit (not shown) which, as previously indicated, operates to descramble the video signal. Thus, a field key is transmitted with the scrambled video signal which, when used in conjunction with the unscrambled security code, provides the decoder with the information required to identify the distortion introduced into the video signal.

As previously indicated, this embodiment of the system of the present invention permits the user to select whether a pay-per-view performance will be accepted at the remote receiving station. If the user, or subscriber, at the receiving station wishes to accept the program which is being transmitted in the video signal which is shown in part in FIG. 2, the user will push an acceptance button 38 (see, FIG. 3) which decrements the program price information stored in acceptance buffer 33 from the value in billing code buffer 41. When the number in the billing code buffer reaches a predetermined low level, illustratively zero, the mode code buffer is disabled, whereby the video signal remains scrambled notwithstanding that all other code information is present to descramble same.

The preferred embodiment described herein employs 5 lines during the vertical interval to send out scrambling codes, one line for each decoder. As discussed, the first half of each line is used for the decoder I.D. and the second half for the "scrambled" scrambling code. Sixty decoders could thus be loaded with new scrambling codes every second, which corresponds to 108,000 per hour. Even at that rate, some kind of code overlapping is necessary during the process of changing codes. Otherwise, decoders which are to be accessed would be useless until their turn arrived to receive the updated security code.

Code overlap is achieved by using field codes which are compatible with two different security codes for the period during which the changeover is taking place. A very simple example will explain Code overlapping: In an actual operation, the algorithm would be substantially more complex than that which is described herein. Nevertheless, let us assume for the sake of illustration that the current security code is 5 and the next security code decided upon will be 7. Assume further that the algorithm being used consists of simply multiplying the security code with the field code, and then subtracting the answer from the highest multiple of 4 which is lower than the answer. The remainder becomes the mode code which will be used to identify the descrambling mode. In other words, if the field code is 8 and the security code 5, the decoder would multiply the two to obtain 35, then it would subtract it from the highest number below 35 which is a multiple of 4, i.e., 32, leaving a remainder of 3, which would then be the mode code.

It will be obvious that the Mode code can vary between 0 and 3. Let us further assume that a specific video field in question requires a mode code of 2. With any given security code, there are a very large number of field codes which will result in a mode code of 2 using the above algorithm. For example, with a security code of 5, field codes of 2, 4, 6, 10, 14, 22 etc would produce the correct mode code. With a security code of 7, field codes of 2, 6, 10, 14, 18, 22, etc will produce a mode code of 2. During the time 5 is the active Scrambling Code the Field Code could vary between 2, 4, 6, 10, 14 and 22. During the overlap period, only the common numbers (2, 6, 10 or 14) would be picked for the field codes. After the overlap period, when 7 is the active security code, the Field Codes of 2, 6, 10, 14, 18 and 22 would produce the correct Mode Code of 2.

The station operator may elect to have some programs on a flat charge and others on a pay-per-view basis. This can be done by including a price code as part of the field code. When the price code is present the decoder looks for the amount left in the billing code and if this amount is 0 or less than the price code, the decoder is not permitted to decode even if all the other codes are present properly.

The foregoing illustrates that the billing information is sent to the decoder in the same manner as the security code, except that it is prearranged in the decoder circuitry that one of the bits of the security code transmission is allocated for the determination of whether the data received is a security code or a billing code. Thus, for example, if that bit is high, it denotes that the rest of the number received is a security code. On the other hand, if that bit is low, it denotes that the received number is a billing code. At the option of the station operator, the signal may contain a price code which is inserted as a part of the field code. The price code is a number which is used to decrement the billing code number whenever the customer presses a button to accept the charge and the program. The decoder will automatically stop decoding when the billing code reaches a predetermined low level, such as 0, whenever a program is received which has a price code on it.

In order to permit the operator of the scrambling system to have a better control over the ID code and conversion coded numbers, one embodiment of this invention would use an easily removable module containing a customized integrated circuit chip. This chips would contain the secret ID code and the conversion code. Individual subscribers could purchase the decoders directly from the decoder manufacturer. The decoders would not contain the customized chips. The system operator would purchase special integrated circuits from the chip manufacturer, load each chip at their own facility with a different set of numbers for each chip, and then furnish a module containing the chip directly to each customer at the time of instituting service. This approach would make it unnecessary for anyone other than the system operator to know the identity of the ID code and conversion code in each decoder.

The coding system described herein is not limited to video applications. When the system is used in other applications, such as to encode facsimile data transmission signals, the data may be transmitted in a continuous stream. The advantages of the present invention are achieved by segmenting the stream into blocks of data, the blocks being separated by a synchronizing code. The synchronizing code permits the decoders to differentiate between the scrambling code information and the data stream comprising the information being transmitted. In some information transmission arrangements, such as facsimile transmissions, such synchronizing codes generally are present within the transmission, such as the End of Page identifier, and there is therefore no need to add a further synchronizing code.

Figure 4:
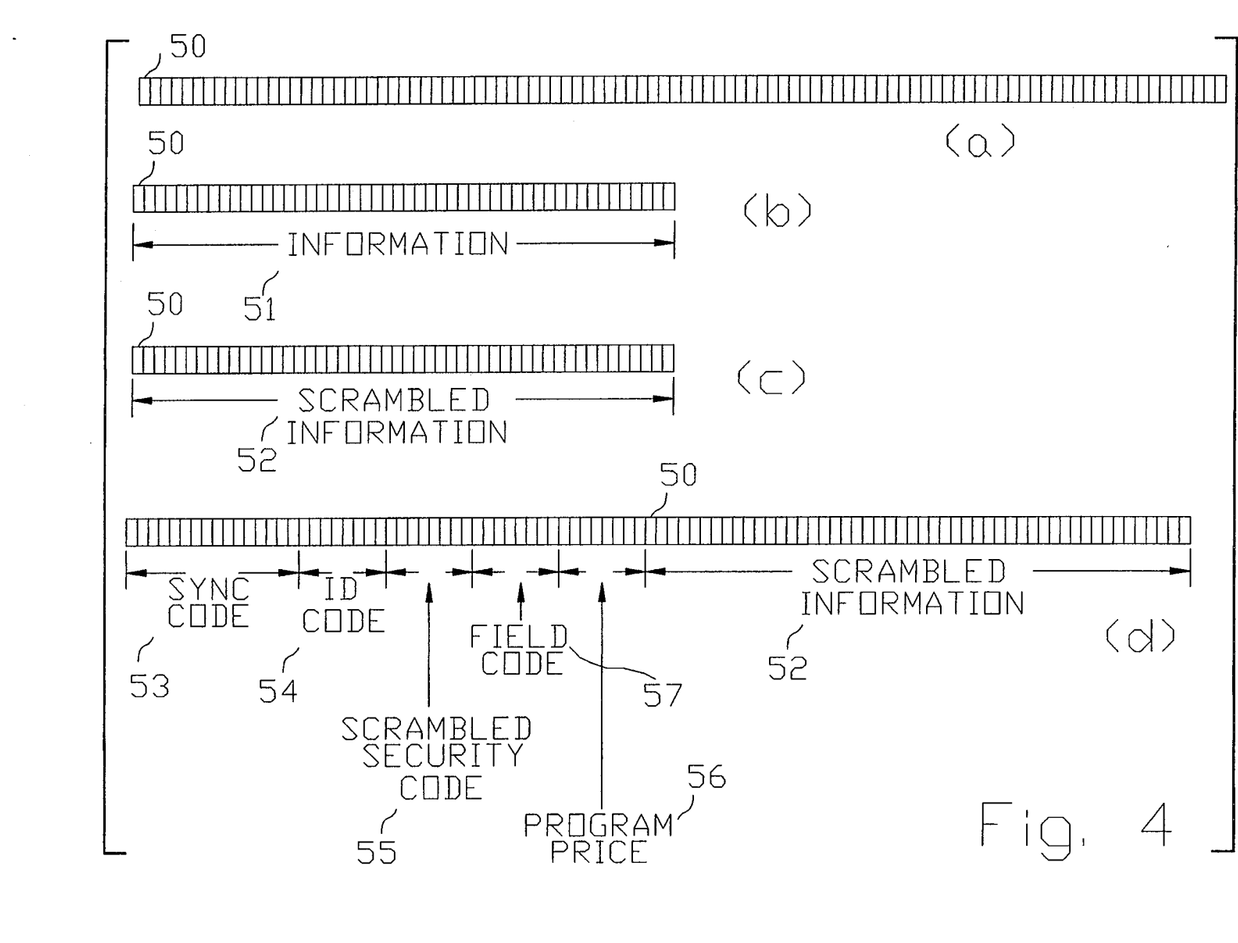

FIG. 4 is a graphic representation of data bit streams and identifies the different portions of the data stream in a specific illustrative embodiment of the invention. This figure shows one illustrative method of implementing code identification within a transmission which does not contain convenient synchronizing identifiers. The size of the blocks must be determined by each individual application, and the preferred manner of implementation is to tailor each application to conform to conveniently sized blocks, in cases where the particular application does not already conform to a configuration where data is processed in this manner. The synchronizing code, also defined as sync code, may be simply a gap of a recognizable size, between blocks. Even when the system of data transmission is not broken up into blocks, there is always a recognizable starting point.

A continuous stream of data is shown in FIG. 4(a). In this embodiment, the data stream is divided into arbitrary blocks, each containing fifty data bits. The starting point 0, and forty-nine of the following bits of information are separated into a block shown in FIG. 4(b). In FIG. 4(c), the information is scrambled in one of several modes. It is to be understood, however, that the present invention is not limited to any particular method or manner of scrambling. It is within the ability of persons of ordinary skill in the art to utilize one or more methods of scrambling the data.

The various components of the coded signal are identified in FIG. 4(d). As shown, sync code 53, is followed by identification code 54. Continuing the sequence, scrambled security code 55, is followed by field code 57, which in turn is followed by data corresponding to a program price 56. The invention is not limited to the relative positions described herein, and may be re-arranged in other embodiments. For the sake of clarity, the identification code, the scrambled security code, the field code and the program price are shown with eight bits each. The sync code is shown in the specific illustrative embodiment to have sixteen bits. The numbers of bits have been selected as illustrative only, and in other applications, the numbers of bits for each of these functions can vary widely from those set forth herein.

The transmitted data is scrambled in one of several possible modes, each of which modes has previously been defined, and a number which corresponds to the specific mode used for each specific block of data and which is used for unscrambling the data at the decoder (not shown). This mode code is identified at the decoder in the same manner as was described for the video scrambling application described earlier.

In addition to the foregoing, it is also useful for the system operator at the transmitter to know exactly which programs or items of data each customer has received during a billing period. This requirement is dictated by the originators of the program material who wish to obtain payment from the system operator, depending upon the number of receivers for their specific programs or data. This is accomplished, in a specific embodiment of the invention, by including a printer 48, which may be of the small, inexpensive type commonly incorporated in portable calculators, in each decoder box. Periodically, the data collected by the decoders during the billing period, is printed on a removable medium such as a conventional paper tape, at each decoder, and this tape can be mailed to the system operator at the transmitter, along with the payment.

In a specific illustrative embodiment of the invention, the transmitted price code is formed of two portions. The first portion consists of a number of bits which are reserved for program identification purposes, and the second portion consists of a number of bits which determine the price of the program. For instance, if eight bits of the price code were used for the program identification number and four bits of the price code for the program price itself, the system would be able to identify up to 256 different programs each of which could have any one of 16 prices.

In a still further illustrative embodiment of the invention, the customer accepts a particular program by communicating with, or manipulating, the decoder unit, such as by pressing acceptance button 38. When the acceptance button is actuated by the customer, the price portion of the price code is applied to decrement the billing code number in billing code buffer 41. However, the program identification code and the program price code are both loaded into a printer storage buffer 47 using conventional circuitry. Printer 48, therefore, is connected to receive data both from the printer storage buffer and the billing storage buffer using conventional technology. When a "print" button (not shown) is actuated by the customer, printer 48 out all the data within printer storage buffer 47, together with the number contained within billing code buffer 41. The customer will, in this embodiment, remove the portion of the printer tape (not shown) containing this information and mail it in with the payment to the supplier of the service.

Since the data on the printed tape contains the prices of all the programs watched, the customer may use it to determine both, the amount of the payment and the amount remaining in the billing code buffer. This printed data can only be used by the customer for his own information. Falsification of the information contained in the tape, would serve no useful purpose, since the decoder is automatically disabled when the amount in the billing code buffer reaches a predetermined low level, as previously stated.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for supplying data contained in a data signal from a sending station exclusively to a preselected one of a plurality of receiving stations, the system comprising:

a scrambling system for distorting the data signal in accordance with a selected one of a plurality of distortion modes to produce a distorted data signal, said scrambling system having an input coupled to the sending station for receiving the data signal;

identification encoder means coupled to said scrambling system for encoding said distorted data signal with identification information which identifies the preselected one of the receiving stations;

security code encoder means coupled to said scrambling system for encoding said distorted data signal with security code information having a predetermined relationship with respect to said identification information on said distorted data signal;

field code encoder means coupled to said scrambling system for encoding said distorted data signal with field code information having a predetermined relationship with respect to said security code information on said distorted data signal; and a plurality of decoder means, each coupled to a respectively associated one of the receiving stations and having associated therewith a respective identification code and a conversion code, each of said decoder means being provided with security code acceptance means responsive to said identification information for accepting said security code information.

2. The system of claim I where said identification information and said conversion code are installed on a removable module.

3. The system of claim I wherein said data signal is a video signal and said scrambled data signal is a scrambled video signal, and there is further provided billing data encoded in said scrambled video signal, said billing data containing a program identification number, said program identification number corresponding to a specific transmitted program, the system further comprising printer storage buffer means for storing said program identification number; and printer means for printing out the information contained in the said printer storage buffer means on a removable medium.

4. The system of claim 3 wherein said printer means is further provided with means for printing data corresponding to an amount of unused credit.

5. The system of claim 1 wherein there is provided security code scrambling means coupled to said security code encoder means for scrambling said security code information.

6. The system of claim 5 wherein there is further provided mathematic combiner means coupled to the receiving station for combining mathematically said scrambled security code information with said field code for producing mode code information corresponding to said selected one of said plurality of distortion modes.

7. The system of claim 5 wherein each of said security code is scrambled in a manner which corresponds exclusively with its respectively associated identification information, whereby only the one of the plurality of decoder means associated with the preselected receiving station is enabled to descramble same.

8. The system of claim 1 wherein there is further provided field modification encoder means for encoding said distorted data signal with field modification information which identifies at least one field component of said distorted data signal.

9. The system of claim 8 wherein there is provided at each said decoder means mode code generator means for generating a mode code which identifies a distortion mode in response to said accepted security code information and said field modification information, for said at least one field component of said distorted data signal.

10. The system of claim 1 wherein there is further provided data storage means coupled to the sending station for storing information corresponding to a relationship between said identification information and said conversion code for each of said decoder means.

11. The system of claim 1 wherein said identification encoder means encodes said identification information and said security code encoder means encodes said security code information onto a blank portion of said distorted data signal.

12. A decoder system for descrambling a scrambled data signal, the decoder system comprising:
first key code receiver means for receiving a first key code encoded in the scrambled data signal, said first key code being in scrambled format in the scrambled data signal and having a predetermined relationship with respect thereto;
second key code receiver means for receiving a second key code in the scrambled data signal;
first key code descrambling means for descrambling said first key code and producing a descramble code for descrambling the data signal; and
first key code identification means for identifying said first key code.

13. The decoder system of claim 12 wherein said first key code descrambling means further comprises:
conversion code storage means for storing conversion data for unscrambling said second key code; and
processing means for producing said descramble code in response to said conversion data and said second key code.

14. The decoder system of claim 12 wherein said first key code is changeable periodically in the scrambled data signal.

15. A system for sending from a sending station an information signal encrypted in a selected one of a plurality of encryption modes to a plurality of receiving stations, each of the receiving stations having a decoder arrangement respectively associated therewith, predetermined ones of the receiving stations being authorized to decode the encrypted signal to receive the information content therein, the system comprising:
security code sending means coupled to the sending station for sending with the encrypted signal a first security code which is to be stored in each of the decoders;
security code change means for changing said first security code in each of said decoders to a second security code over a transitional period of time; and
field code generator means for sending field code information compatible with said first and second security codes during said transitional period of time.

16. The system of claim 15 wherein there is further provided processing means for providing a mode code corresponding to the selected one of the encryption modes in response to a selectable one of said first and second security codes, and said field code.

17. A method of supplying data information contained in a data signal from a sending station exclusively to a preselected one of a plurality of receiving stations, each of the receiving stations having a decoder associated therewith, the method comprising the steps of:
dividing the data into sequential data fields, each such data field having a field code assigned thereto and transmitted therewith, said field code being selected from a multiplicity of possible field codes, said multiplicity of field codes being divided into a plurality of categories of field codes;
distorting sequentially each of the data fields of the data signal at the sending station in accordance with a respective predetermined one of a plurality of alternative distortion modes, each of said distortion modes being characterized by an associated mode code;
encoding an identification code onto the data signal which uniquely identifies one of the decoders;
encoding a first security key onto the data signal at the sending station, said first security key being encoded in a predetermined scrambled format and in a predetermined relationship with respect to said encoded identification code;
transmitting the encoded data signal to the plurality of receiving stations;
decoding said identification code at said uniquely identified decoder;
descrambling the first security key in response to a conversion algorithm which is specific to said decoder at said selected receiving station, whereby said uniquely identified decoder accepts the first security key;
obtaining said mode code in response to said first security key and said field code; and
descrambling a data field in response to said associated mode code.

18. The method of claim 17 wherein there are provided the further steps of:
encoding at the sending station a second security key onto the data signal said second security key being encoded in a predetermined scrambled format and in a predetermined relationship with respect to said encoded identification code;

descrambling the second security key in response to a conversion algorithm which is specific to said decoder at said selected receiving station, whereby said uniquely identified decoder accepts the first security key;

selecting at the sending station for the sequential data fields, respective field codes selected from the category of fields codes wherein the same mode code is obtained in response to either of said first or second security keys, and said field code.

19. The method of claim 18 wherein there are provided the further steps of:

forming a mode code at said receiving station responsive to said descrambled first security key or said second security key, said mode code corresponding to said predetermined one of said plurality of alternative distortion modes; and removing at said receiving station a distortion applied in said step of distorting the data signal, in response to said mode code.

20. The method of claim 19 wherein there are provided the further steps of:

encoding at the sending station a billing code onto the data signal;

storing at said receiving station billing data responsive to said billing code;

enabling said step of removing in response to said billing data.

21. The method of claim 20 wherein said step of enabling comprises the further step of initiating at the receiving station a decrementation of said billing data.

22. A method of unscrambling a scrambled data signal in a predetermined one of a plurality of decoders, the method comprising the steps of:

receiving at an input of each of the decoders a scrambled security code, each decoder having a respectively associated conversion code installed therein, said scrambled security code can be descrambled by a conversion code respectively associated with the predetermined one of the plurality of decoders;

receiving at said input of each of the decoders a field code, during a predetermined portion of a signal to be unscrambled;

combining said field code with an unscrambled version of said security code to produce a mode code; and unscrambling a field portion of said scrambled data signal corresponding to said field code in response to said mode code.

23. A system for sending from a sending station an information signal encrypted in a selected one of a plurality of encryption modes to a receiving station, the receiving station having a decoder arrangement respectively associated therewith, the receiving station being authorized to decode the encrypted signal to receive the information content therein, the system comprising:

security code sending means coupled to the sending station for sending with the encrypted signal a first security code which is to be stored in the decoder;

security code change means for changing said first security code in said decoder to a second security code over a transitional period of time;

field code generator means for sending field code information compatible with said first and second security codes during said transitional period of time; and processing means for providing to the decoder a mode code corresponding to the selected one of the encryption modes in response to a selectable one of said first and second security codes, and said field code.

24. In a system wherein a data signal is transmitted from a sending station to a receiving station, and for which payment is required for reception at the receiving station, a method including the steps of:

incorporating into the data signal at the sending station a billing code corresponding to an amount of payment credit available at the receiving station;

incorporating into the data signal at the sending station price data corresponding to a program price corresponding to a charge to the receiving station for a particular program transmitted in the data signal storing credit information corresponding to said billing code at said receiver location; and storing price information corresponding to said price data at said receiver location;

decrementing said credit information in response to said price information.

25. The method of claim 24 wherein there is provided the further step of disabling the receiving station from descrambling the data in the data signal in response to said credit information being decremented to a predetermined level.

* * * * *